(12) United States Patent
Lim

(10) Patent No.: US 12,099,283 B2
(45) Date of Patent: Sep. 24, 2024

(54) CAMERA MODULE

(71) Applicant: SAMSUNG ELECTRO-MECHANICS CO., LTD., Suwon-si (KR)

(72) Inventor: Soo Cheol Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 158 days.

(21) Appl. No.: 17/843,581

(22) Filed: Jun. 17, 2022

(65) Prior Publication Data
US 2023/0221621 A1    Jul. 13, 2023

(30) Foreign Application Priority Data

Jan. 12, 2022    (KR) .................. 10-2022-0004708

(51) Int. Cl.
*G03B 13/36* (2021.01)
*G03B 5/04* (2021.01)
*H04N 23/55* (2023.01)

(52) U.S. Cl.
CPC ............ *G03B 13/36* (2013.01); *G03B 5/04* (2013.01); *G03B 2205/0015* (2013.01); *H04N 23/55* (2023.01)

(58) Field of Classification Search
USPC .............. 396/55, 104; 348/208.1–208.8, 348/208.11–208.16, 208.99
See application file for complete search history.

(56) References Cited

U.S. PATENT DOCUMENTS

| | | | |
|---|---|---|---|
| 9,319,574 B2 | 4/2016 | Shin et al. | |
| 9,578,242 B2* | 2/2017 | Kang | G03B 3/10 |
| 9,848,126 B2* | 12/2017 | Kang | G03B 17/12 |
| 10,334,170 B2* | 6/2019 | Heo | H04N 23/55 |
| 2010/0053784 A1 | 3/2010 | Kang et al. | |

(Continued)

FOREIGN PATENT DOCUMENTS

| | | |
|---|---|---|
| KR | 10-2010-0026882 A | 3/2010 |
| KR | 10-2014-0144126 A | 12/2014 |

(Continued)

OTHER PUBLICATIONS

Korean Office Action issued on Nov. 22, 2023, in counterpart Korean Patent Application No. 10-2022-0004708 (7 pages in English, 5 pages in Korean).

*Primary Examiner* — Clayton E. LaBalle
*Assistant Examiner* — Warren K Fenwick
(74) *Attorney, Agent, or Firm* — NSIP Law

(57) ABSTRACT

A camera module includes: a housing; a carrier accommodated in the housing, and configured to move in an optical axis direction; a lens unit accommodated in the carrier, and configured to move in the optical axis direction together with the carrier; a driving unit configured to move the carrier; and a guide unit configured to guide the movement of the carrier, and comprising: a ball member configured to move in the optical axis direction; and a guide groove unit comprising a plurality of guide grooves in which the ball member is disposed, wherein the plurality of guide grooves comprise a first guide groove in which an angle between normals of two adjacent surfaces of the first guide groove in contact with the ball member is an acute angle.

19 Claims, 12 Drawing Sheets

(56) References Cited

U.S. PATENT DOCUMENTS

2014/0362284 A1* 12/2014 Shin ................. G02B 27/646
                                                         348/373
2017/0205600 A1    7/2017 Kim
2022/0252895 A1*   8/2022 Kwon ................. G03B 30/00

FOREIGN PATENT DOCUMENTS

| KR | 10-1653762 B1   | 9/2016  |
| KR | 10-1740814 B1   | 5/2017  |
| KR | 10-2020-0073096 A | 6/2020  |
| KR | 10-2150893 B1   | 9/2020  |
| KR | 10-2020-0124413 A | 11/2020 |
| KR | 10-2021-0070504 A | 6/2021  |

* cited by examiner

CAMERA MODULE

CROSS-REFERENCE TO RELATED APPLICATIONS

This application claims the benefit under 35 USC § 119(a) of Korean Patent Application No. 10-2022-0004708, filed on Jan. 12, 2022, in the Korean Intellectual Property Office, the entire disclosure of which is incorporated herein by reference for all purposes.

BACKGROUND

1. Field

The following description relates to a camera module.

2. Description of Related Art

Camera modules may be employed in portable electronic devices including smartphones, tablet PCs, laptops, and the like.

Camera modules employed in portable electronic devices may be equipped with an autofocus (AF) function and an optical image stabilization (OIS) function.

Meanwhile, as various functions are added to the camera module, a size of the camera module may increase and a weight thereof may increase, and accordingly, impact force due to collisions between components of the camera module may increase, even with the same external impacts.

In particular, in the case of a camera module having a ball guide-type actuator, when a collision occurs between the components of the camera module, dents may occur on a contact surface of the ball member, preventing smooth movements of the ball member, thereby causing degradation of the AF function and the OIS function of the camera module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing; a carrier accommodated in the housing, and configured to move in an optical axis direction; a lens unit accommodated in the carrier, and configured to move in the optical axis direction together with the carrier; a driving unit configured to move the carrier; and a guide unit configured to guide the movement of the carrier, and comprising: a ball member configured to move in the optical axis direction; and a guide groove unit comprising a plurality of guide grooves in which the ball member is disposed, wherein the plurality of guide grooves comprise a first guide groove in which an angle between normals of two adjacent surfaces of the first guide groove in contact with the ball member is an acute angle.

An angle between two adjacent surfaces of the first guide groove may be greater than 90° and less than or equal to 110°.

The first guide groove may have a 'v'-shaped cross-sectional shape.

The guide groove unit may include: a main guide groove unit configured to guide movement of the carrier, and comprising the first guide groove; and an auxiliary guide groove unit configured to support the movement of the carrier.

The main guide groove unit may include first guide grooves that face each other in a direction perpendicular to the optical axis direction.

The auxiliary guide groove unit may include a second guide groove of which a surface, in contact with the ball member, is formed to be flat.

The guide groove unit may include a plurality of ball members comprising the ball member, and a ball member of the ball members disposed in the auxiliary guide groove unit has a larger size than another ball member of the ball members disposed in the main guide groove unit.

The plurality of guide grooves may include another first guide groove in which a portion, in contact with another ball member, has a curvature.

In another general aspect, a camera module includes: a housing; a carrier accommodated in the housing, and configured to move in an optical axis direction; a lens unit accommodated in the carrier, and configured to move in the optical axis direction together with the carrier; a driving unit configured to move the carrier; and a guide unit configured to guide the movement of the carrier, and comprising: a ball member configured to move in the optical axis direction; and a guide groove unit comprising a plurality of guide grooves in which the ball member is disposed, wherein the plurality of guide grooves comprise a first guide groove in which a portion, in contact with the ball member, has a curvature.

The first guide groove may be in either one or both of point contact and line contact with the ball member.

The guide groove unit may include: a main guide groove unit configured to guide movement of the carrier, and comprising the first guide groove; and an auxiliary guide groove unit configured to support the movement of the carrier.

The main guide groove unit may include first guide grooves that face each other in a direction perpendicular to the optical axis direction.

The auxiliary guide groove unit may include a second guide groove of which a surface, in contact with the ball member, is formed to be flat.

The guide groove unit may include a plurality of ball members comprising the ball member, and a ball member of the ball members disposed in the auxiliary guide groove unit may have a larger size than another ball member of the ball members disposed in the main guide groove unit.

The plurality of guide grooves in the main guide groove unit may extend along the optical axis direction, and the plurality of guide grooves in the auxiliary guide groove unit may extend in different directions.

In another general aspect, a camera module includes: a housing; a carrier accommodated in the housing, and configured to move in an optical axis direction; a lens unit accommodated in the carrier, and configured to move in the optical axis direction together with the carrier; a driving unit configured to move the carrier; and a guide unit configured to guide the movement of the carrier, and comprising: a ball member configured to move in the optical axis direction; and a guide groove unit comprising a plurality of guide grooves in which the ball member is disposed, wherein the guide groove unit may include: a main guide groove unit in which the plurality of guide grooves extend along the optical axis direction; and an auxiliary guide groove unit in which the plurality of guide grooves extend in different directions.

The guide groove unit may include guide grooves facing in a direction perpendicular to the optical axis direction, and the auxiliary guide groove unit may include: a first guide groove extending in the optical axis direction; and a second guide groove extending in a direction oblique to the optical axis direction.

The main guide groove unit may include first guide grooves that face in a direction perpendicular to the optical axis direction.

The first guide groove and the second guide groove may have a Y-shaped cross-sectional shape.

Other features and aspects will be apparent from the following detailed description, the drawings, and the claims.

Figure 1:
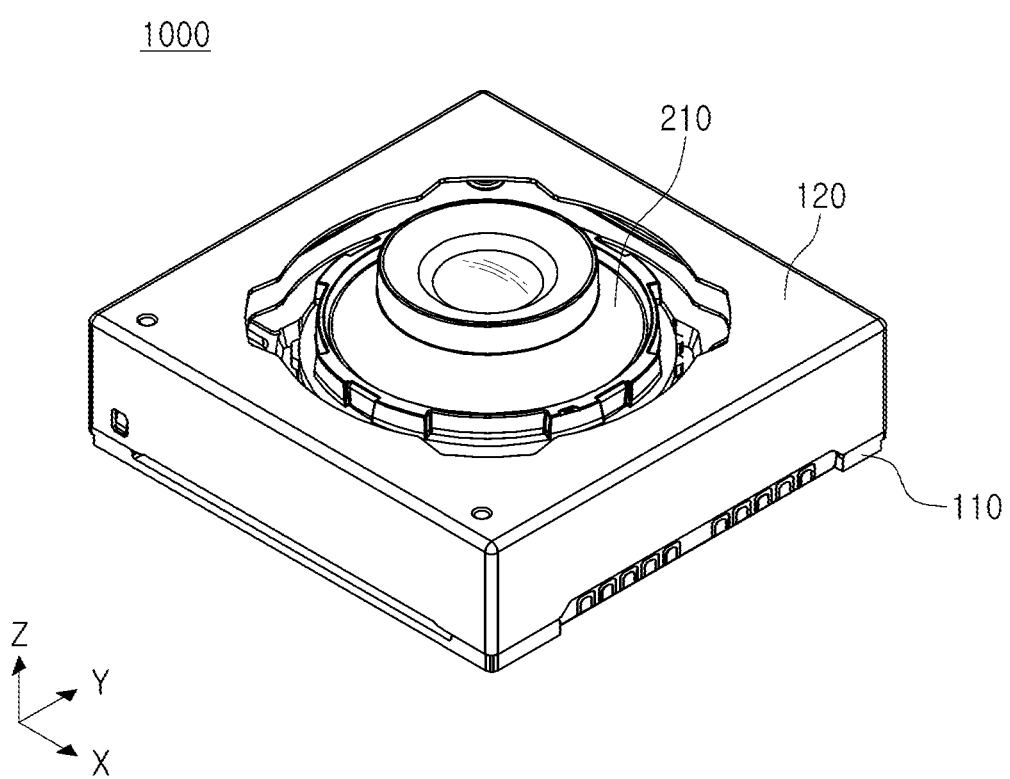
FIG. 1 illustrates a perspective view of a camera module according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms such as "first," "second," and "third" are used to explain various members, components, regions, layers, or sections, these members, components, regions, layers, or sections are not to be limited by these terms. Rather, these terms should be used only to distinguish one member, component, region, layer, or section from another member, component, region, layer, or section. For example, a "first" member, component, region, layer, or section referred to in the examples described herein may also be referred to as a "second" member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

A camera module of one or more embodiments may be applied to, or included in, portable electronic devices such as a mobile communication terminal, a smartphone, a table PC, and the like.

The camera module may be an optical device that takes pictures and/or moving pictures, and may include a lens that refracts light reflected from a subject, and a lens driving device (hereinafter, actuator) that moves the lens to adjust a focus or correct shake.

Figure 2:
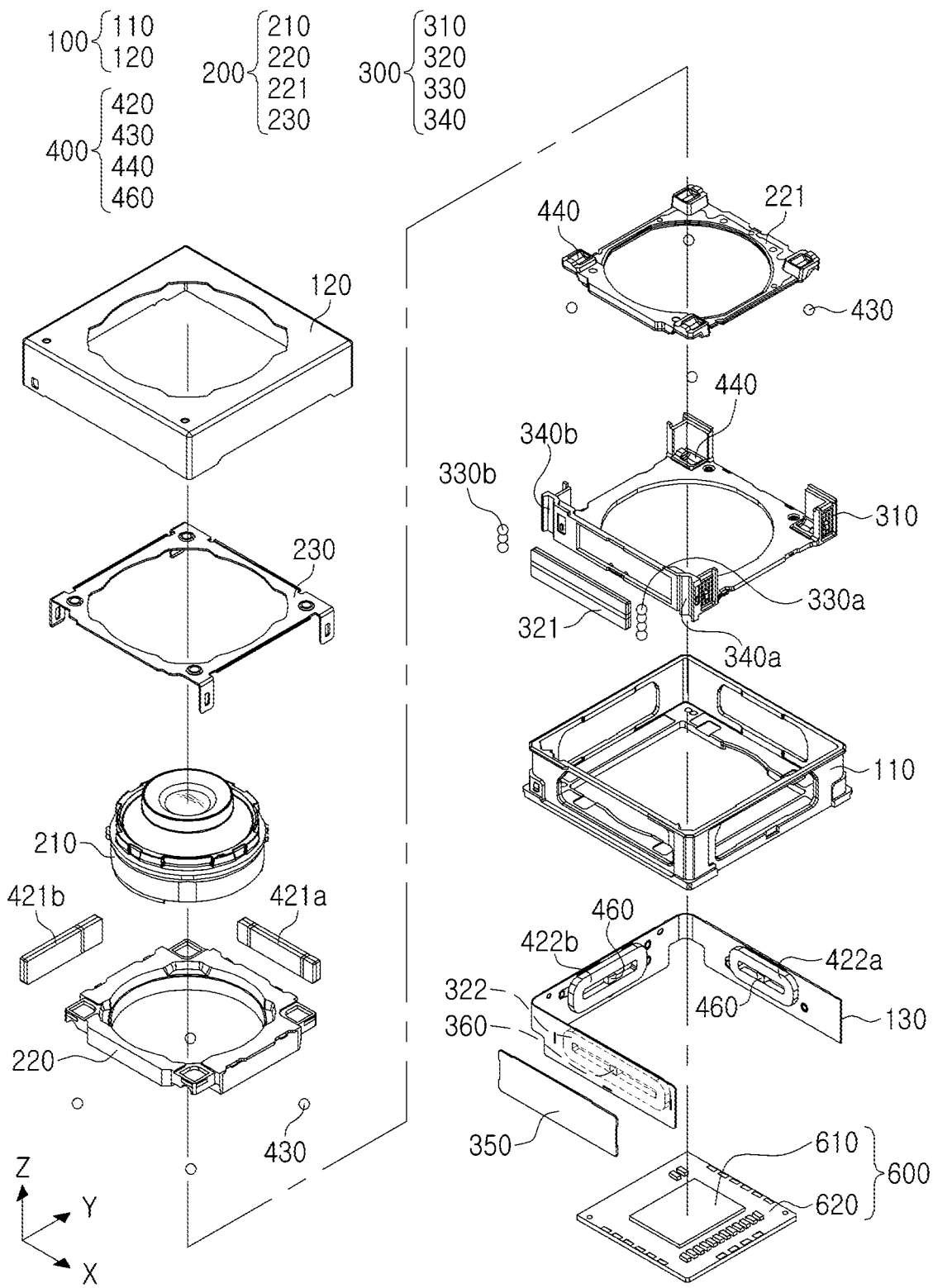
FIG. 2 illustrates a schematic exploded perspective view of a camera module according to one or more embodiments.

FIG. 1 illustrates a perspective view of a camera module according to one or more embodiments, and FIG. 2 illustrates a schematic exploded perspective view of a camera module according to one or more embodiments.

Referring to FIGS. 1 and 2, a camera module 1000 may include a housing unit 100, a lens unit 200, actuator units 300 and 400, and an image sensor unit 600, and may include a buffer member to reduce flow noise when the lens unit 200 is driven.

The housing unit 100 may include a housing 110 and a shield can 120.

The housing 110 may be formed of a material that is easy to mold. In an example, the housing 110 may be formed of a plastic material.

The housing 110 may accommodate the lens unit 200 and the actuator units 300 and 400.

The housing 110 may have an internal space, and may be formed such that all or part of upper and lower portions, and four side surfaces are open. The housing 110 may accommodate the lens unit 200 and the actuator units 300 and 400 in the internal space and the opened portion.

In an example, the lens unit 200 may be disposed in the internal space of the housing 110, and the actuator units 300 and 400 may be disposed in the internal space of the housing 110 and the opened portion of the side surface of the housing 110. In addition, the image sensor unit 600 may be disposed in an opened portion of a lower portion of the housing 110.

The shield can 120 may be coupled to the housing 110 to surround the housing 110.

The shield can 120 may protect the components accommodated in the housing 110 from impacts.

In addition, the shield can 120 may perform a function of shielding electromagnetic waves. In an example, the shield can 120 may prevent electromagnetic waves generated from the camera module 1000 from affecting other electronic components in a portable electronic device to which the camera module is applied to or included in, and conversely, may prevent electromagnetic waves generated from other electronic components mounted on the portable electronic device from affecting the camera module 1000.

The shield can 120 may be formed of a metal material to shield electromagnetic waves. The image sensor unit 600 may include an image sensor 610 and a printed circuit board 620. The shield can 120 may be grounded to a ground pad of the printed circuit board 620 on which the image sensor 610, a non-limiting example of which will be described later, is disposed.

The lens unit 200 may include a lens barrel 210 and a lens holder 220.

One or more lenses for imaging a subject may be disposed in the lens barrel 210. The one or more lenses may have the same or different optical properties (e.g., refractive index) and may be disposed in the lens barrel 210, and the number of lenses of the one or more lenses may vary depending on an embodiment or configuration.

The lens barrel 210 may be formed in a hollow cylindrical shape to have an internal space, and the lens barrel 210 may accommodate the one or more lenses in the internal space. The internal space of the lens barrel 210 may be designed or constructed according to the number of lenses disposed in the lens barrel 210, and the one or more lenses may be mounted inside the lens barrel 210 in an optical axis direction (Z-axis direction).

The lens holder 220 may be coupled to the lens barrel 210. In an example, the lens holder 220 may be coupled to the lens barrel 210 to surround the lens barrel 210. The lens holder 220 may have a space into which the lens barrel 210 may be inserted, and the lens barrel 210 may be fixed to the space of the lens holder 220.

The lens holder 220 may guide movement of the lens barrel 210. The lens barrel 210 may move in an optical axis direction (Z-axis direction) and a direction perpendicular to the optical axis direction (X-axis direction and/or Y-axis direction) while being coupled to the lens holder 220.

A frame 221 may be disposed below the lens holder 220. In an example, the frame 221 may be disposed between the lens holder 220 and a carrier 310, a non-limiting example of which will be described later. That is, the lens holder 220, the frame 221, and the carrier 310 may be sequentially disposed based on the optical axis direction (Z-axis direction).

A part of the second actuator 400, a non-limiting example of which will described later, may be disposed in the lens holder 220 and the frame 221. In an example, a magnet that generates driving force that moves the lens barrel 210 in a direction perpendicular to the optical axis direction (X-axis direction and Y-axis direction), and/or a ball member 430 that guides movement of the lens barrel 210 in a direction perpendicular to the optical axis direction (X-axis direction and Y-axis direction), may be disposed on the frame 221. Non-limiting example descriptions related thereto will be described later.

Meanwhile, the camera module 1000 according to one or more embodiments of the present disclosure may further include a stopper 230 that prevents separation of the components due to external impacts.

The stopper 230 may be coupled to the carrier 310 to cover at least a portion of an upper surface of the lens holder 220.

The stopper 230 may include the lens holder 220, to prevent the frame 221, a plurality of ball members 330, and the like from being separated from the carrier 310 due to sudden movement or external impacts. In addition, the stopper 230 may include a damper, on a surface facing the lens holder 220 in an optical axis direction (Z-axis direction), to reduce noise, or the like, generated by vibration of the lens holder 220, and the like due to external impacts.

The actuator units 300 and 400 may include a first actuator unit 300 (or an AF actuator unit) 300 for autofocusing (AF) and a second actuator unit 400 (or an OIS actuator unit) for optical image stabilization (OIS).

The camera module 1000 according to the one or more embodiments of the present disclosure may include either one or both of the first actuator unit 300 and the second actuator unit 400, (e.g., may include the first actuator unit 300 and the second actuator unit 400).

According to one or more embodiments of the present disclosure, the actuator unit may have a ball guide method using a rolling movement of a ball member, and may include a driving unit that moves the carrier 310 and/or the lens unit 200 and a guide unit that guides the carrier 310 and/or the lens unit 200.

The first actuator unit 300 may be configured to move the lens unit 200 to focus on a subject.

The first actuator unit 300 may include the carrier 310 and a first driving unit 320. The carrier 310 may be accommodated (e.g., disposed) in the housing 110 to accommodate the lens unit 200, and the first driving unit 320 may generate driving force that moves the lens unit 200 and the carrier 310 in an optical axis direction (Z-axis direction).

The first driving unit 320 may include a magnet (e.g., a first magnet 321) and a coil (e.g., a first coil 322).

According to one or more embodiments of the present disclosure, the first magnet 321 may be disposed on one surface of the carrier 310, and the first coil 322 may be disposed on the housing 110. The first coil 322 may be disposed on an opened portion of the side surface of the housing 110 via a substrate 130, and may be disposed to face the first magnet 321.

The first magnet 321 may be a moving member disposed on the carrier 310 and may move in the optical axis direction (Z-axis direction) together with the carrier 310, and the first coil 322 may be a fixed member fixed to the housing 110. However, the present disclosure is not limited thereto, and in one or more embodiments, positions of the first magnet 321 and the first coil 322 may be changed or switched so that the first magnet 321 may be a fixed member and the first coil 322 may be a moving member.

When power is applied to the first coil 322, the carrier 310 may move in the optical axis direction (Z-axis direction) by electromagnetic force between the first magnet 321 and the first coil 322. When the lens unit 200 is accommodated in the carrier 310, as the carrier 310 moves in the optical axis direction (Z-axis direction), the lens unit 200 may also move in the optical-axis direction (Z-axis direction).

For example, the carrier 310 and the lens unit 200 may relatively move in the optical axis direction (Z-axis direction) with respect to the housing unit 100 by the first driving unit 320 in a state accommodated in the housing unit 100.

Movement of the carrier 310 by the first driving unit 320 may be guided by the ball member 330 of the guide unit.

The ball member 330 may be disposed on one surface of the carrier 310 on which the first magnet 321 is disposed, and may be disposed on both sides of the first magnet 321.

The ball member 330 may roll when driving force is generated by the first driving unit 320. In an example, a guide groove unit 340 in which the ball member 330 is accommodated may be formed on a surface facing in a direction perpendicular to the optical axis direction of the carrier 310 and the housing 110 (Y-axis direction based on the drawing), and the ball member 330 may roll in the guide groove unit 340.

The carrier 310 may move smoothly in the optical axis direction (Z-axis direction) by the ball member 330. When the carrier 310 moves in the optical axis direction (Z-axis direction), the ball member 330 may reduce frictional force acting between the carrier 310 and the housing 110.

A yoke 350 may be disposed in the housing 110. The yoke 350 may be disposed to face the first magnet 321 with the first coil 322 interposed between the yoke 350 and the first magnet 321.

The yoke 350 may include a magnetic material, and attractive force may act between the yoke 350 and the first magnet 321 in a direction perpendicular to the optical axis direction (Z-axis direction). Accordingly, the ball member 330 may maintain a contact state with the carrier 310 and the housing 110 by the attractive force between the yoke 350 and the first magnet 321.

In addition, the yoke 350 may also perform a function to focus magnetic force of the first magnet 321. In an example, the yoke 350 and the first magnet 321 may form a magnetic circuit. Accordingly, the yoke 350 may prevent a magnetic flux from leaking externally.

Meanwhile, another yoke may also be disposed between the carrier 310 and the first magnet 321, and this yoke may focus the magnetic force to prevent leakage of the magnetic flux.

A position sensor 360 may be disposed in the housing 110. The position sensor 360 may be disposed on the opened portion of the side surface of the housing 110 together with the first coil 322 via the substrate 130, and may be disposed to face the first magnet 321.

The camera module 1000 according to one or more embodiments of the present disclosure may use a closed-loop control method for detecting a position of the lens unit 200 to feed back the same.

The position sensor 360 may detect a position of the lens unit 200. In an example, the position sensor 360 may be a Hall sensor.

When the camera module 1000 is powered on, an initial position of the lens unit 200 may be detected by the position sensor 360, and the lens unit 200 may move from the detected initial position to an initial setting position. Here, the detected initial position may mean a position of the lens unit 200 in the optical axis direction, and the initial setting position may mean a position at which a focus of the lens unit 200 becomes infinity.

The lens unit 200 may move from the initial setting position to a target position by a driving signal of a circuit element that provides a driving signal to the first driving unit 320. In a focus adjustment process, the lens unit 200 may move in both directions in the optical axis direction (Z-axis direction).

The second actuator unit 400 may be configured to move the lens unit 200 to compensate for blurring of an image or shaking of a video due to factors such as a user's hand shaking when taking an image or video.

The second actuator unit 400 may include a second driving unit 420. The second driving unit 420 may generate driving force to move the lens unit 200 in a direction perpendicular to the optical axis direction (X-axis and/or Y-axis direction).

The second driving unit 420 may include a magnet (e.g., a second magnet 421) and a coil (e.g., a second coil 422).

According to one or more embodiments of the present disclosure, the second magnet 421 may be disposed on one surface of the lens holder 220. In an example, a plurality of second magnets 421 (e.g., including second magnets 421a and 421b) may be provided, and the plurality of second magnets 421 may be respectively disposed on different surfaces of the lens holder 220.

The second coil 422 may be disposed in the housing 110. In an example, a plurality of second coils 422 (e.g., including second coils 422a and 422b) may be provided, and the plurality of second coils 422 may be disposed in the opened portion of the side surface of the housing 110 to face the plurality of second magnets 421 through the substrate 130, respectively.

The plurality of second magnets 421 may be moving members disposed on the lens holder 220 to move in a direction perpendicular to the optical axis direction (X-axis and/or Y-axis), and the plurality of second coils 422 may be fixed members fixed to the housing 110. However, one or more embodiments thereof is not limited thereto, and in one or more embodiments, positions of the second magnet 421 and the second coil 422 may be changed or switched, such that the second magnet 421 may be a fixed member, and the second coil 422 may be a moving member.

When power is applied to the second coil 422, the lens unit 200 may move in a direction perpendicular to the optical axis direction (X-axis and/or Y-axis direction) by electromagnetic force between the second magnet 421 and the second coil 422.

The second driving unit 420 may include an X-axis driving unit 420a that generates driving force to move the lens unit 200 in the X-axis direction, and a Y-axis driving unit 420b that generates driving force to move the lens unit 200 in the Y-axis direction.

Referring to the drawings, the second magnet 421a and the second coil 422a disposed to be in parallel with a Y-axis in the second driving unit 420 may correspond to the X-axis driving unit 420a that generates driving force in the X-axis direction, and the second magnet 421b and the second coil 422b disposed to be in parallel with an X-axis may correspond to the Y-axis driving unit 420b that generates driving force in the Y-axis direction.

That is, the lens unit 200 may relatively move in a direction perpendicular to the optical axis direction (X-axis and/or Y-axis direction) with respect to a housing unit 100 and the carrier 310, when the lens unit 200 is accommodated in the housing unit 100 and the carrier 310.

The movement of the lens unit 200 by the second driving unit 420 may be guided by the ball member 430 of the guide unit.

The ball member 430 may be disposed between the lens holder 220 and the frame 221 and between the frame 221 and the carrier 310. That is, the ball member 430 may be disposed in two stages in the optical axis direction (Z-axis direction).

The ball member 430 may support the lens holder 220 and the frame 221 while guiding the movement of the lens unit 200. In addition, the ball member 430 may also maintain a gap between the lens holder 220, the frame 221, and the carrier 310.

The plurality of ball members 430 may be respectively disposed between the lens holder 220 and the frame 221 and between the frame 221 and the carrier 310.

In an example, the plurality of ball members 430 disposed between the lens holder 220 and the frame 221 may guide the movement of the lens unit 200 in the Y-axis direction by the Y-axis driving unit 420b, and may support the movement of the lens unit 200.

In addition, the plurality of ball members 430 disposed between the frame 221 and the carrier 310 may guide the movement of the lens unit 200 in the X-axis direction by the X-axis driving unit 420a, and support the movement of the lens unit 200.

The ball member 430 may roll when driving force is generated by the second driving unit 420. In an example, a guide groove unit 440 having a ball member 430 accommodated therein may be formed on a surface facing in an optical axis direction (Z-axis direction) of the frame 221 and the carrier 310, and the ball member 430 may roll in the guide groove unit 440.

The guide groove unit 440 may be formed on one surface of the lens holder 220 and the frame 221 facing in the optical axis direction (Z-axis direction) and on one surface of the frame 221 and the carrier 310 facing in the optical axis direction (Z-axis direction). The ball member 430 may be disposed to be fitted in the guide groove unit 440.

In an example, when driving force is generated by the y-axis driving unit 420b, the ball member 430 disposed between the lens holder 220 and the frame 221 may roll only or predominantly in the Y-axis direction (and not in the X-axis direction, for example) in a state accommodated in the guide groove unit 440 formed on one surface of the lens holder 220 and the frame 221 facing in the optical axis direction (Z-axis direction). To configure the ball member 430 disposed between the frame 221 and the carrier 310 to roll only or predominantly in the Y-axis direction, a planar shape of the lens holder 220 and the guide groove unit 440 formed on one surface of the frame 221 facing in the optical axis direction (Z-axis direction) may have a rectangular shape having a length in the Y-axis direction.

In addition, when driving force is generated by the x-axis driving unit 420a, the ball member 430 disposed between the frame 221 and the carrier 310 may roll only or predominantly in the X-axis direction (and not in the Y-axis direction, for example) in a state accommodated in the guide groove unit 440 formed on one surface of the frame 221 and the carrier 310 facing in the optical axis direction (Z-axis direction). To configure the ball member 430 disposed between the frame 221 and the carrier 310 to roll only or predominantly in the X-axis direction, a planar shape of the guide groove unit 440 formed on one surface of the frame 221 and the carrier 310 facing each other in the optical axis direction (Z-axis direction) may have a rectangular shape having a length in the X-axis direction.

A position sensor 460 may be disposed in the housing 110. The position sensor 460 may be disposed on the opened portion of the side surface of the housing 110 together with the second coil 422 via the substrate 130, and may be disposed to face the second magnet 421.

The camera module 1000 according to one or more embodiments of the present disclosure may use a closed-loop control method, for detecting a position of the lens barrel 210 to feed back the same.

The position sensor 460 may detect a position of the lens unit 210. In an example, the position sensor 460 may be a Hall sensor.

The image sensor unit 600 may include the image sensor 610 and the printed circuit board 620.

The image sensor 610 may convert light incident through the lens unit 200 into an electrical signal. In an example, the image sensor 610 may be or include a charge coupled device (CCD) and/or a complementary metal-oxide semiconductor (CMOS).

The electrical signal converted by the image sensor 610 may be output as an image through a display unit of the portable electronic device.

The image sensor 610 may be fixedly disposed on the printed circuit board 620. The image sensor 610 may be electrically connected to the printed circuit board 620 through wire bonding.

The image sensor unit 600 may further include an infrared filter. The infrared filter may block light in the infrared region among the light incident through the lens unit 200.

Meanwhile, the camera module 1000 according to one or more embodiments of the present disclosure may include a structure of the guide groove units 340 and 440 for reducing dent formation of the ball members 330 and 340 due to external impacts.

Figure 3:
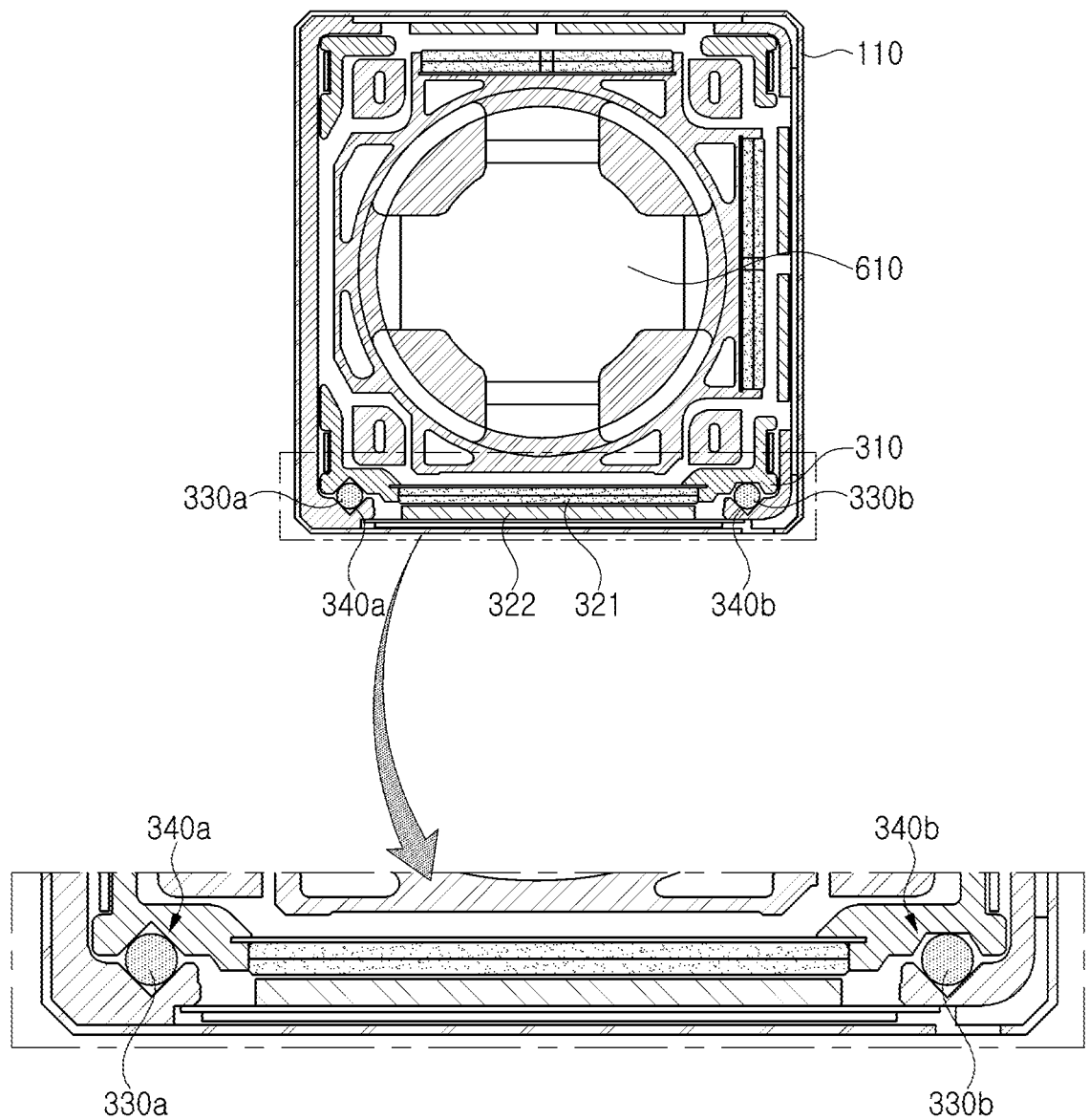
FIG. 3 illustrates a conceptual diagram of a guide unit of a first actuator unit according to one or more embodiments.
Figure 4:
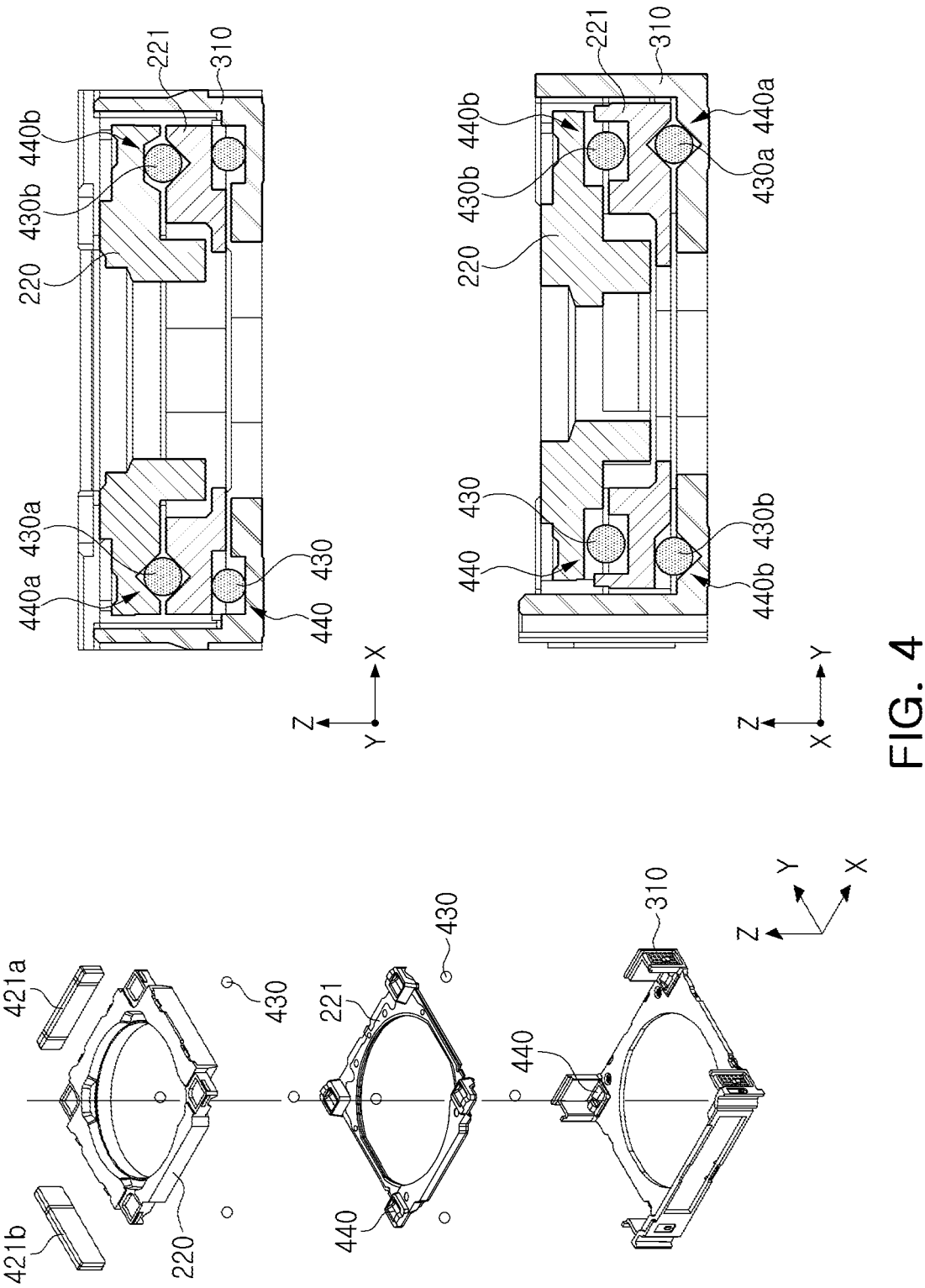
FIG. 4 illustrates a conceptual diagram of a guide unit of a second actuator unit according to one or more embodiments.

FIG. 3 illustrates a conceptual diagram of a guide unit of a first actuator unit according to one or more embodiments, and FIG. 4 illustrates a conceptual diagram of a guide unit of a second actuator unit according to one or more embodiments.

According to one or more embodiments of the present disclosure, the guide unit may guide the movement of the carrier 310 and/or the lens unit 200 by the driving force of the actuator unit.

The guide unit may include ball members 330 and 430 and guide groove units 340 and 440. The ball members 330 and 430 may roll while disposed in the guide groove units 340 and 440.

Figure 5A:
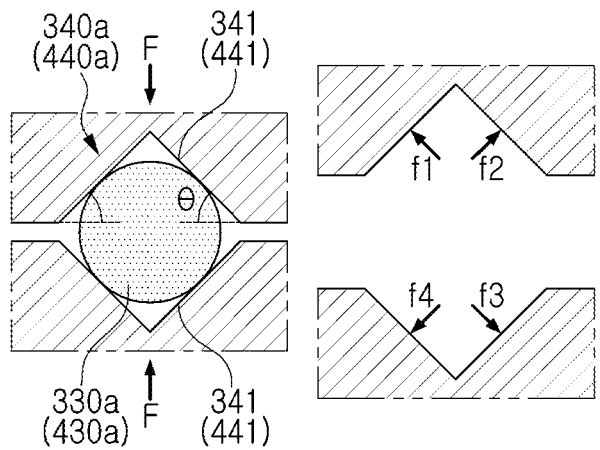
FIGS. 5A-5C illustrate a conceptual diagram of impact force according to a shape of a guide groove unit when external force is applied according to one or more embodiments.
Figure 5B:
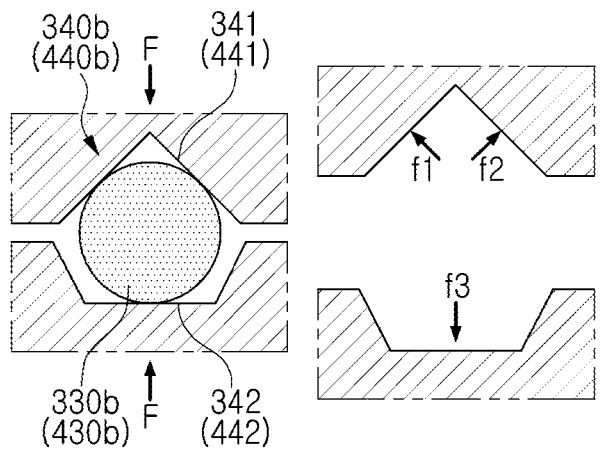
Figure 5C:
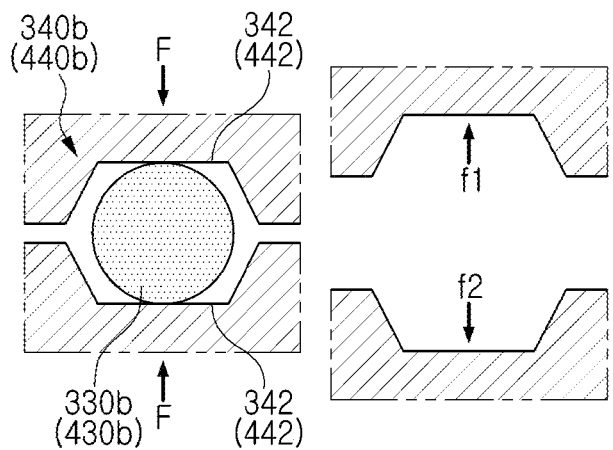

As illustrated in FIGS. 5A-5C, for example, the guide groove unit 340 may include guide grooves 341 and 342 facing each other, and the guide groove unit 440 may include guide grooves 441 and 442 facing each other. The ball member 330 may be disposed in the guide groove unit 340 in a form of being fitted to the guide grooves 341 and 342 facing each other, and the ball member 430 may be disposed in the guide groove unit 440 in a form of being fitted to the guide grooves 441 and 442 facing each other.

In an example, artificial force (e.g., magnetic attractive force) that respectively adheres the ball members 330 and 430 to the guide grooves 341, 342, 441, and 442 facing each other may be provided.

The ball member 330 of the first actuator unit 300 may roll in an optical axis direction (Z-axis direction). To configure the ball member 330 of the first actuator unit 300 to roll in the optical axis direction, the guide groove unit 340 of the first actuator unit 300 may be formed to extend in the optical axis direction (Z-axis direction). For example, the guide groove unit 340 may include guide grooves 341 and 342 that extend in the optical axis direction (Z-axis direction).

The ball member 430 of the second actuator unit 400 may roll in a direction perpendicular to the optical axis direction (X-axis and/or Y-axis direction). To configure the ball member 430 of the second actuator unit 400 to roll in a direction perpendicular to the optical axis direction, the guide groove unit 440 of the second actuator unit 400 may be formed to extend in a direction perpendicular to the optical axis direction (X-axis and/or Y-axis direction). For example, the guide groove unit 440 of the second actuator unit 400 may include a guide groove unit that extends in the X-axis direction and a guide groove unit that extends in the Y-axis direction, and the guide groove unit 440 may include guide grooves 441 and 442 that extend in the X-axis direction or Y-axis direction.

In an example, in FIG. 4, the guide groove unit 440 formed on one surface of the frame 221 and the carrier 310 facing in the optical axis direction (Z-axis direction) may be a guide groove unit that extends in the X-axis direction, and the guide groove unit 440 formed on one surface of the lens holder 220 and the frame 221 facing in the optical axis direction (Z-axis direction) may be a guide groove unit that extends in the Y-axis direction. However, the present disclosure is not limited thereto, and in one or more embodiments, the guide groove 440 that extends in the X-axis direction may be formed on one surface of the lens holder 220 and the frame 221 facing in the optical axis direction (Z-axis direction), and the guide groove unit 440 that extends in the Y-axis direction may be formed on one surface of the frame 221 and the carrier 310 facing in the optical axis direction (Z-axis direction).

According to one or more embodiments of the present disclosure, the guide unit may support while guiding the movement of the carrier 310 and/or the lens unit 200. To support while guiding the movement of the carrier 310 and/or the lens unit 200, the guide unit may include guide groove units 340 and 440 of different types, as illustrated in FIGS. 3 and 4.

In an example, the guide unit may include main guide groove units 340a and 440a and auxiliary guide groove units 340b and 440b.

The main guide groove units 340a and 440a may guide the movement of the carrier 310 and/or the lens unit 200. The main guide grooves 340a and 440a may move the carrier 310 or the lens unit 200 in the optical axis direction (Z-axis direction) or a direction perpendicular to the optical axis direction (X-axis and/or Y-axis direction) by the driving force of the first driving unit 320 or the second driving unit 420.

The main guide groove units 340a and 440a may respectively include first guide grooves 341 and 441. The first guide grooves 341 and 441 may have grooves to make two-point contact with the ball members 330a and 430a. In an example, the first guide grooves 341 and 441 may have a 'v-shaped cross-sectional shape. However, the cross-sectional shape of the first guide groove 341 is not limited thereto.

The main guide groove units 340a and 440a may have a form in which the respective first guide grooves 341 and 441 having grooves are disposed to face each other, and the main guide groove units 340a and 440a may impart a moving direction to the ball members 330a and 440a.

The auxiliary guide groove units 340b and 440b may support the movement of the carrier 310 and/or the lens unit 200. When the carrier 310 and/or the lens unit 200 move along the main guide groove units 340a and 340b, the auxiliary guide groove units 340b and 440b may prevent shaking and tilting of the carrier 310 and/or the lens unit 200 to enable stable movement.

The auxiliary guide grooves 340b and 440b may respectively include second guide grooves 342 and 442. The second guide grooves 342 and 442 may have a surface, in contact with the ball members 330b and 430b, that is formed to be flat. The ball members 330b and 430b may contact the second guide grooves 342 and 442 at one point (e.g., at a point of the flat surface).

The auxiliary guide groove units 340b and 440b have a form in which the second guide grooves 342 and 442 are disposed to face each other, or a form in which the first guide grooves 341 and 441 and the second guide grooves 342 and 442 having grooves are disposed to face each other.

Since the ball members 330b and 430b respectively disposed in the auxiliary guide groove units 340b and 440b move more freely within the guide groove units 340 and 440 than the ball members 330a and 430a disposed in the main guide groove units 340a and 440a, the movement of the carrier 310 and/or the lens unit 200 may be smoothly guided.

In a typical camera module, since ball members are closely disposed between guide grooves facing each other in a guide unit, when strong impact is applied to the guide unit from the outside, a dent may be formed on a contact surface of the ball members, and the dent may interfere with the rolling movement of the ball members, thereby reducing a guide function of the guide unit.

FIGS. 5A-5C illustrate a conceptual diagram of impact force according to a shape of a guide groove unit when external force is applied according to one or more embodiments.

Referring to FIG. 5, impact force (f), generated when external force (F) is applied to the guide unit may be distributed to a portion in which ball members 330 and 430 and guide grooves 341, 342, 441, and 442 are in contact, may be applied to the ball members 330 and 430.

Meanwhile, a magnitude of the impact force (f) applied to the ball members 330 and 430 may be different depending on a shape of the guide grooves 341, 342, 441, and 442.

In an example, the impact force (f) applied to the ball members 330 and 430 in contact with the first guide grooves 341 and 441 ($\theta=45$) may be smaller than the impact force (f) applied to the ball members 330 and 430 in contact with the second guide grooves 342 and 442, and as the impact force (f) applied to the ball members 330 and 430 decreases, dents on a surface in contact with the ball members 330 and 430 may be reduced.

Figure 6A:
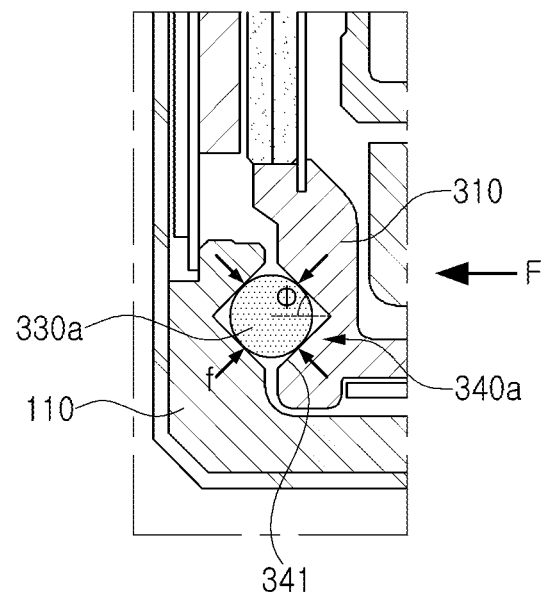
FIGS. 6A-6B illustrate a conceptual diagram of a guide unit according to one or more embodiments.
Figure 6B:
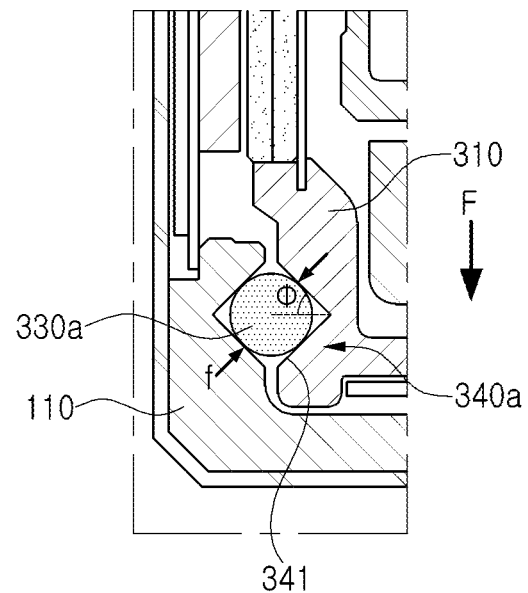

FIGS. 6A-6B illustrate a conceptual diagram of a guide unit according to one or more embodiments.

Although a guide unit of a first actuator unit 300 is illustrated in FIG. 6, the same may be applied to a second actuator unit 400.

According to one or more embodiments of the present disclosure, guide groove units 340 and 440 may respectively include first guide grooves 341 and 441 each having an angle (180-2φ) between normals of two adjacent surfaces in contact with the ball members 330 and 430 having an acute angle.

The first guide grooves 341 and 441 may have a 'v-shaped' cross-sectional shape, and the angle (2φ) between two adjacent surfaces of the first guide grooves 341 and 441 may satisfy the following Equation 1 below, for example.

90<2φ≤110(2φ:angle between the first guide grooves)    Equation 1

The following (Table 1) is a table illustrating by comparing impact force (f) according to the angle (2φ) between the first guide grooves when external force (F) of FIG. 6A is applied, and the following (Table 2) is a table illustrating by comparing impact force (f) according to the angle (2φ) between the first guide grooves when external force (F) of FIG. 6B is applied.

TABLE 1

| 2φ | 110 | 100 | 90 | 80 | 70 |
|---|---|---|---|---|---|
| f Magnitude | 0.31F | 0.33F | 0.35F | 0.39F | 0.44F |
| Ratio | 89% | 94% | 100% | 111% | 126% |

TABLE 2

| 2φ | 110 | 100 | 90 | 80 | 70 |
|---|---|---|---|---|---|
| f Magnitude | 0.57F | 0.64F | 0.71F | 0.77F | 0.82F |
| Ratio | 81% | 90% | 100% | 108% | 115% |

According to the results of (Table 1) and (Table 2), when the angle between the first guide grooves (2φ) increases from 90 degrees to 110 degrees, which is normally applied, the impact force (f) decreases to 89% and 81%, respectively.

Accordingly, as in the one or more embodiments of the present disclosure, an angle (180-2φ) between the normals of the adjacent two surfaces in contact with ball members 330 and 430 includes first guide grooves 341 and 441 each having an acute angle between the normals, dents of the ball members 330 and 430 may be reduced.

According to one or more embodiments of the present disclosure, the main guide groove unit 340a of the first actuator unit 300 may have a form in which the first guide groove 341 described above faces in a direction perpendicular to an optical axis direction (Y-axis direction based on the drawing).

The auxiliary guide groove unit 340b of the first actuator unit 300 may have a form in which the second guide groove 342 of which a surface, in contact with the ball member 330b, is formed to be flat faces in a direction perpendicular to an optical axis direction (Y-axis direction based on the drawing), or may have a form in which the first guide grooves 341 and 441 and the second guide grooves 342 and 442 described above, face in a direction perpendicular to an optical axis direction (Y-axis direction based on the drawing).

In addition, according to one or more embodiments of the present disclosure, a main guide groove unit 440a of a second actuator unit 400 may have a form in which the above-described first guide groove 441 faces in an optical axis direction (Z-axis direction), and the auxiliary guide groove unit 440b may have a form in which the second guide groove faces in an optical axis direction (Z-axis direction), or may have a form in which the first guide groove 441 and the second guide groove 442, described above, face in an optical axis direction (Z-axis direction).

Meanwhile, in the case of the auxiliary guide groove units 340b and 440b including the second guide groove 342, it may be difficult to apply the above-described shape of the first guide groove 341 and 441.

Accordingly, according to one or more embodiments of the present disclosure, in order to reduce the dents of the ball members 330b and 430b accommodated in the auxiliary guide grooves 340b and 440b, the auxiliary guide grooves 340b and 440b may include ball members 330b and 440b having a larger diameter than that of the ball members 340a and 440a.

As the size of the ball members 330 and 430 increases, dent resistance to external impact may be improved, such that the occurrence of dents in the ball members 330 and 430 may be reduced.

Figure 12A:
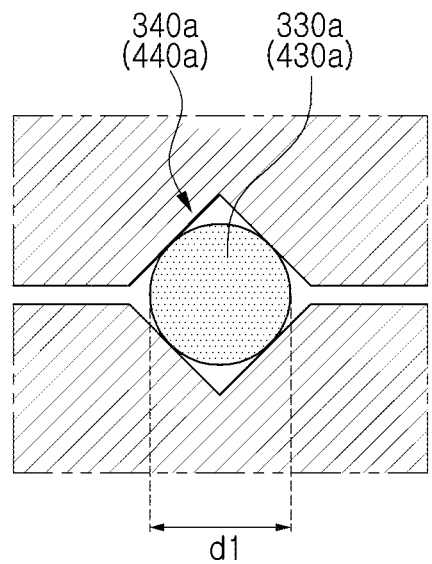
FIGS. 12A-12B illustrate a conceptual diagram of a guide unit according to one or more embodiments.
Figure 12B:
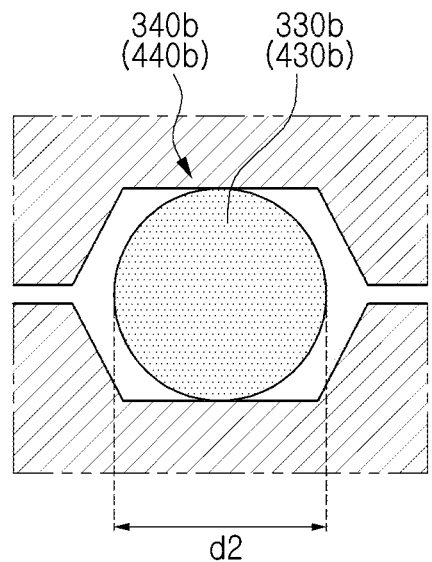

FIGS. 12A-12B illustrate a conceptual diagram of a guide unit according to one or more embodiments.

Referring to FIG. 12, a diameter d2 of the ball members 330b and 430b respectively disposed in the auxiliary guide groove units 340b and 440b may be greater than a diameter d1 of the ball members 330a and 430a respectively disposed in the main guide groove units 340a and 440a.

As described above, according to one or more embodiments of the present disclosure, by disposing the ball members 330b and 430b (having a larger diameter than the ball members 330a and 430a) in the auxiliary guide groove units 340b and 440b (having a higher degree of freedom of rolling movement than the main guide groove units 340a and 440a), the resistance to dent formation may be improved.

Figure 7A:
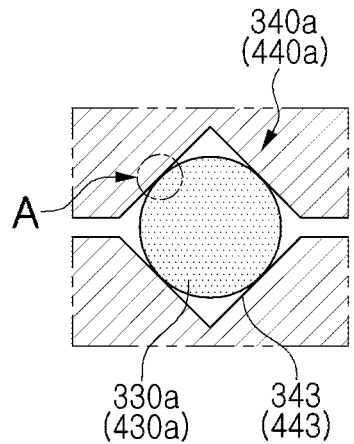
FIGS. 7A-7C illustrate a conceptual diagram of a guide unit according to one or more embodiments.
Figure 7B:
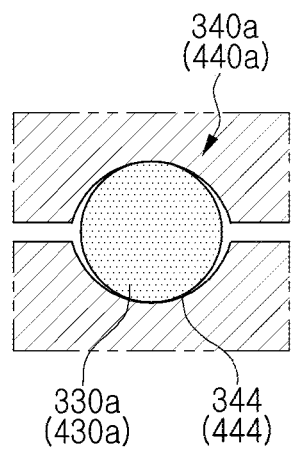
Figure 7C:
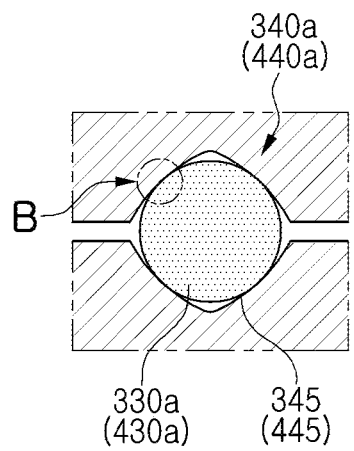

FIGS. 7A-7C illustrate a conceptual diagram of a guide unit according to one or more embodiments.

According to one or more embodiments of the present disclosure, the guide groove unit 340 may include first guide grooves 344 and 345 having a portion, in contact with the ball member 330, having a curvature. Further, the guide groove unit 440 may include first guide grooves 444 and 445 having a portion, in contact with the ball member 430, having a curvature.

The first guide grooves 344, and 444 may have a 'U-shaped cross-sectional shape (see FIG. 7B), and the first guide grooves 345 and 445 may have a round 'v-shaped cross-sectional shape (see FIG. 7C).

When a portion, in contact with the ball member 330 and 430 of the first guide groove 344, 345, 444, and 445 has a curvature, a contact length between the first guide grooves 344, 345, 444, and 445 and the ball members 330 and 430 may be increased, such that dent resistance may be improved when an external impact is applied.

In an example, the ball members 330a and 430a may be in point contact with the first guide grooves 343 and 443 of FIG. 7A, but may be in line contact with the first guide grooves 344 and 444 of FIG. 7B. Accordingly, when the same impact force is applied to the guide grooves 340 and 440, the impact force may be dispersed in the structure of FIG. 7B.

In an example, to smoothly guide the movement of the carrier 310 and/or the lens unit 200, a length at which the ball members 330a and 430a and the first guide grooves 343 and 443 are in line contact, may be appropriately designed or constructed.

Meanwhile, in FIG. 7C, the ball members 330a and 430a may be in point contact with the first guide grooves 345 and 445, but when the same dent occurs, a contact length of the first guide grooves 345 and 445 and the ball members 330a and 430a increases, so that the impact force may be dispersed, thereby reducing a size of the dent.

Figure 8A:
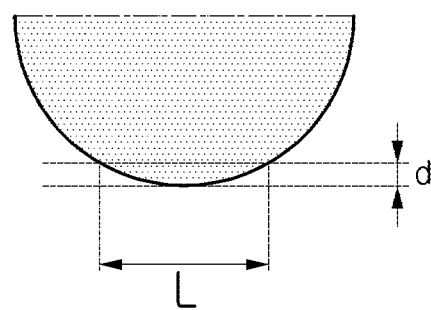
FIGS. 8A-8B illustrate an enlarged view of regions according to one or more embodiments.
Figure 8B:
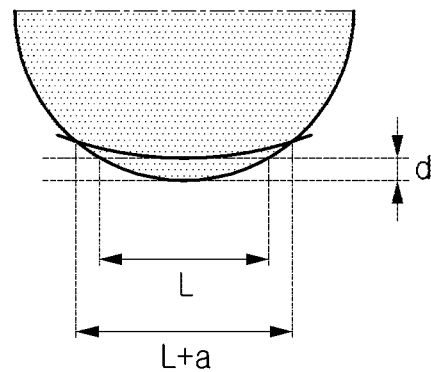

FIGS. 8A-8B illustrate an enlarged view of regions (e.g., regions A and B of FIG. 7) according to one or more embodiments.

Referring to FIGS. 8A and 8B, in the case of the first guide grooves 345 and 445 according to FIG. 7C despite the same dent depth (d) and the same point contact, compared to the first guide grooves 343 and 443 according to FIG. 7A, there is an effect in a length of supporting ball members 330a and 430a increases such that impact force (L→L+a) is dispersed, and accordingly, dents of the ball members 330a and 430a can be improved (e.g., a size of the dents may be reduced).

According to one or more embodiments of the present disclosure, the main guide groove unit 340a of the first actuator unit 300 may have a form in which the above-described first guide groove 341 faces in a direction perpendicular to an optical axis direction (Y-axis direction based on the drawing).

The auxiliary guide groove unit 340b of the first actuator unit 300 may have a form in which the second guide groove 342 in which a surface, in contact with the ball member 330b, is formed to be flat faces in a direction perpendicular to an optical axis direction (Y-axis direction based on the drawing), or may have a form in which the first guide grooves 341 and 441 and the second guide grooves 342 and 442, described above, face in a direction perpendicular to an optical axis direction (Y-axis direction based on the drawing).

In addition, according to one or more embodiments of the present disclosure, a main guide groove unit 440a of a second actuator unit 400 may have a form in which the first guide groove 441 described above faces an optical axis direction (Z-axis direction), and an auxiliary guide groove unit 440b may have a form in which the second guide groove 442 faces an optical axis direction (Z-axis direction), or have a form in which the first guide groove 441 and the second guide groove 442, described above, face each other in an optical axis direction (Z-axis direction).

According to one or more embodiments of the present disclosure, to reduce the dents of the ball member 330b and 430b accommodated in the auxiliary guide groove unit 340b and 440b, the auxiliary guide groove unit 340b, 440b may include ball members 330b and 430b having a larger diameter than that of the main guide groove units 340a and 440a. A description related thereto is substituted for the above description.

Figure 9A:
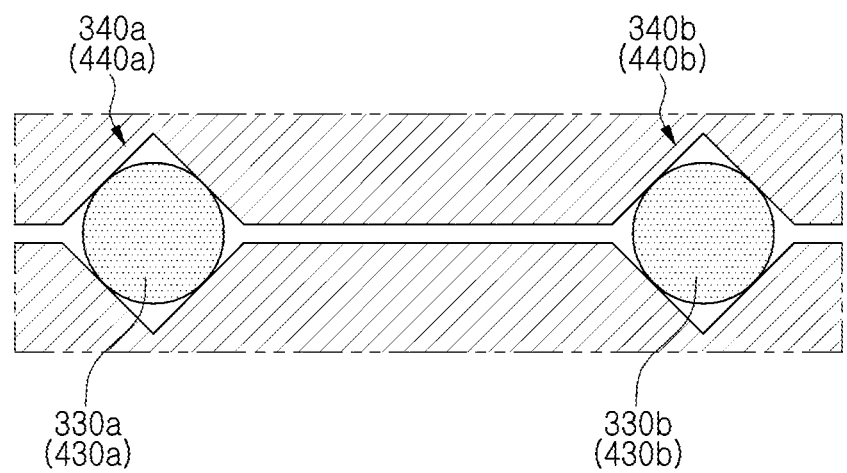
FIGS. 9A-9B illustrate a conceptual diagram of an example of a problem when a main guide groove unit and an auxiliary guide groove unit have a same shape.
Figure 9B:
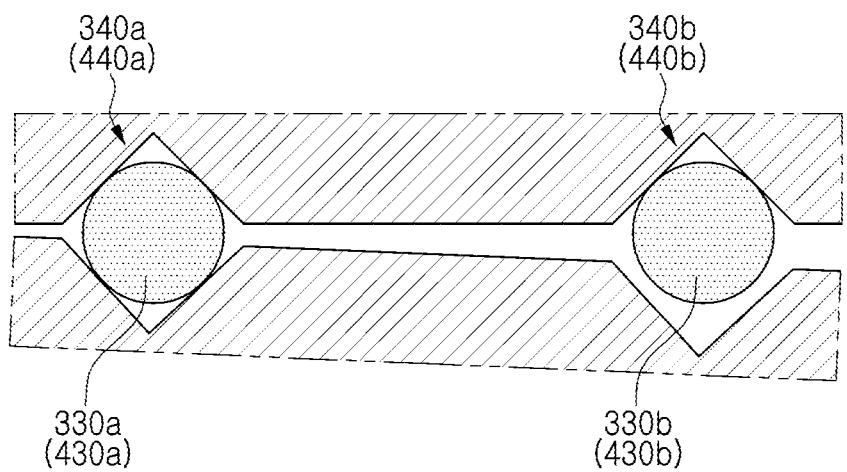
Figure 10:
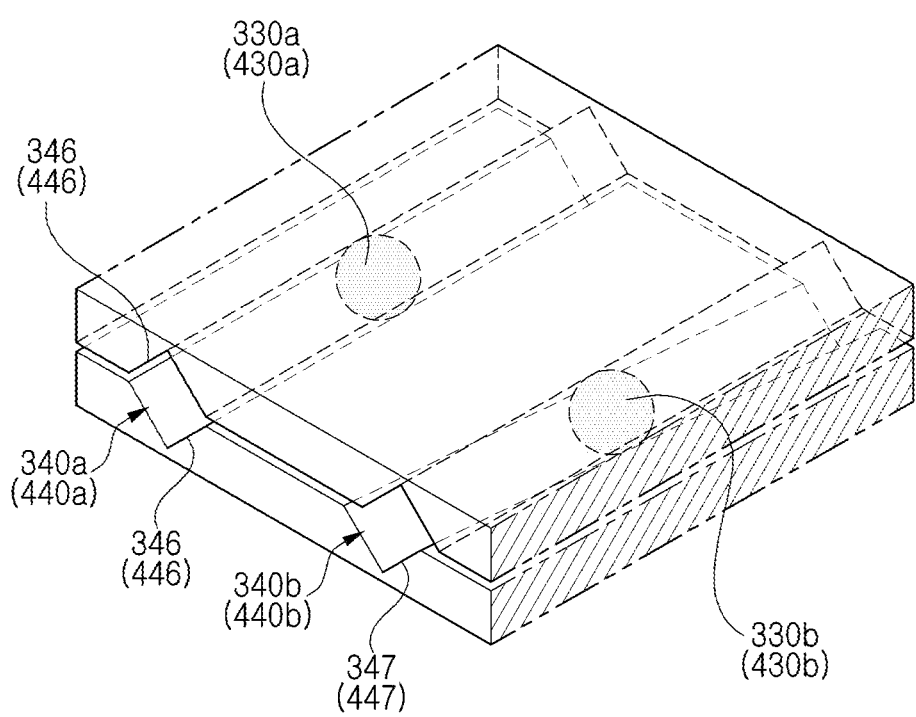
FIG. 10 illustrates a conceptual diagram of a guide unit according to one or more embodiments.
Figure 11A:
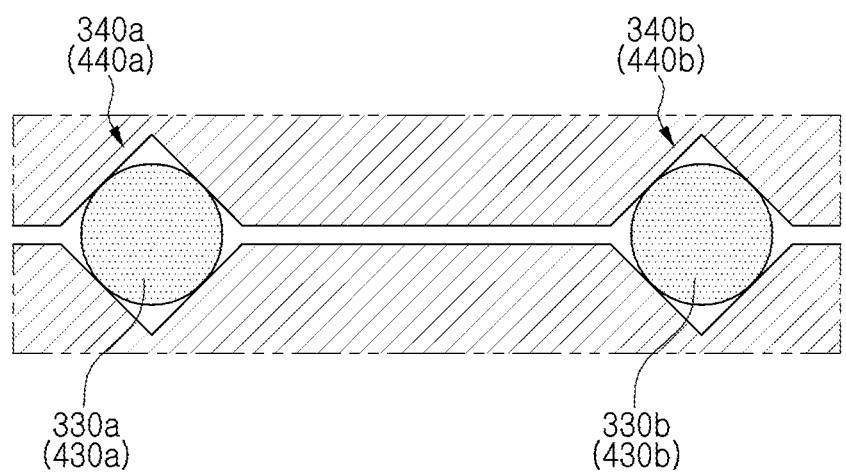
FIGS. 11A-11B illustrate a side view and a plan view of a guide unit according to one or more embodiments.
Figure 11B:
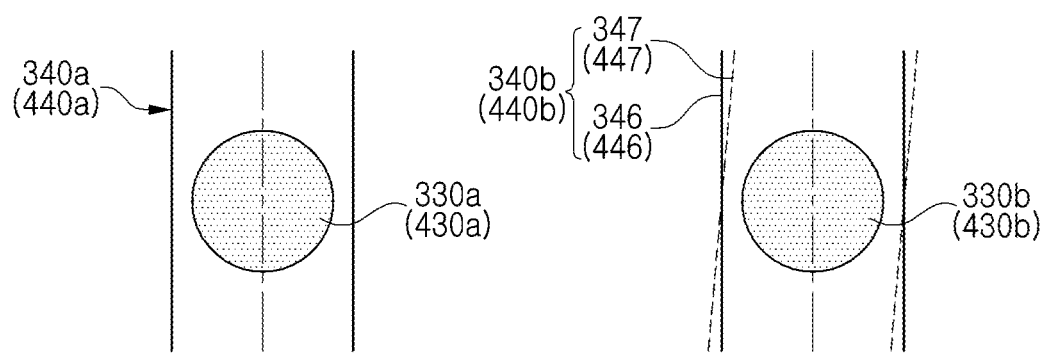

FIGS. 9A-9B illustrate a conceptual diagram of an example of a problem of a typical camera module including a main guide groove unit and an auxiliary guide groove unit that have a same shape, FIG. 10 illustrates a conceptual diagram of a guide unit according to one or more embodiments, and FIGS. 11A-11B illustrate a side view and a plan view of a guide unit (e.g., the guide unit of FIG. 10) according to one or more embodiments.

Referring to FIG. 9, when both main guide groove units 340a and 440a and auxiliary guide groove units 340b and 440b are formed to have a form in which a guide groove having a 'v cross-sectional shape having a groove face each other, it is preferable that ball members 330 and 430 are disposed in the guide groove unit as illustrated in FIG. 9A, but in reality, since the ball members 330 and 430 are disposed in the guide groove unit as illustrated in FIG. 9B, due to manufacturing tolerance or assembly tolerance, movement of the carrier 310 and/or the lens unit 200 may not be smoothly guided.

Accordingly, as in the one or more embodiments of the present disclosure, the main guide groove units 340a and 440a may be formed in a form in which a guide groove having grooves face each other, and the auxiliary guide grooves 340b and 440b may be formed to include second guide grooves 342 and 442 in which a surface, in contact with the ball members 330 and 430, is formed to be flat.

Meanwhile, according to one or more embodiments of the present disclosure, in order to overcome manufacturing tolerance or assembly tolerance as illustrated in FIG. 9, the auxiliary guide grooves 340b and 440b may be formed to include guide grooves 346, 347, 446 and 447 extending in different directions (e.g., as shown in FIG. 10).

For example, the main guide groove units 340a and 440a may include guide grooves 346 and 446 extending in the same direction, and the auxiliary guide grooves 340b and 440b may include guide grooves 346, 446, 347, and 447 extending in different directions.

In an example, in the case of a guide unit of a first actuator unit 300, the main guide groove unit 340a may have a form in which a first guide groove 346 extending in an optical axis direction (Z-axis direction) in a direction perpendicular to the optical axis direction (Y-axis direction based on the drawing), and the auxiliary guide groove unit 340b may have a form in which the first guide groove 346 extending in the optical axis direction (Z-axis direction) and a second guide groove 347 extending in an oblique direction with respect to the optical axis direction (Z-axis direction) face each other.

In the case of a guide unit of a second actuator unit 400, the main guide groove unit 440a may have a form in which a first guide groove 446 extending in a direction perpendicular to an optical axis direction (X-axis and/or Y-axis direction) faces in the optical direction (Z-axis direction), and the auxiliary guide groove unit 440b may have a form in which the first guide groove 446 extending in a direction perpendicular to an optical axis direction (X-axis and/or Y-axis direction) and a second guide grooves 447 extending in an oblique direction with respect to the optical axis direction (X-axis and/or Y-axis direction) face each other.

In addition, the first guide grooves 346 and 446 and the second guide grooves 347 and 447 may have a 'v-shaped cross-sectional shape. However, the present disclosure is not limited thereto, and the first guide grooves 346 and 446 and the second guide grooves 347 and 447 may be formed to have other cross-sectional shapes having grooves.

In other words, according to the one or more embodiments of the present disclosure, the main guide groove units 340a, 440a and the auxiliary guide groove units 340b, 440b may be in a form in which a guide groove having grooves faces each other, and the auxiliary guide groove unit 340b and 440b may be in a form in which a guide groove having grooves extending in different directions face each other.

The first guide grooves 346 and 446 and the second guide grooves 347 and 447 of the auxiliary guide groove units 340b and 440b may have an alignment angle within a predetermined range.

As described above, when the first guide grooves 346 and 446 and the second guide grooves 347 and 447 constituting the auxiliary guide groove units 340b and 440b are obliquely disposed to have overlapping regions, a lifting phenomenon of the ball members 330b and 430b due to manufacturing tolerance or assembly tolerance can be prevented, and accordingly, dents of the ball members 330 and 430 can be reduced.

Through the above embodiments, the camera module 1000 according to one or more embodiments of the present disclosure can reduce dents of the ball members 330 and 430 due to external impacts.

As set forth above, the camera module 1000 according to one or more embodiments of the present disclosure may minimize occurrence of dents on a contact surface of a ball member.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing;
   a carrier accommodated in the housing, and configured to move in an optical axis direction;
   a lens unit accommodated in the carrier, and configured to move in the optical axis direction together with the carrier;
   a driving unit configured to move the carrier; and
   a guide unit configured to guide the movement of the carrier, and comprising:
      a ball member configured to move in the optical axis direction; and
      a guide groove unit comprising a plurality of guide grooves in which the ball member is disposed,
   wherein the plurality of guide grooves comprise a first guide groove in which an angle between normals of two adjacent surfaces of the first guide groove in contact with the ball member is an acute angle.

2. The camera module of claim 1, wherein an angle between two adjacent surfaces of the first guide groove is greater than 90° and less than or equal to 110°.

3. The camera module of claim 1, wherein the first guide groove has a 'v'-shaped cross-sectional shape.

4. The camera module of claim 1, wherein the guide groove unit comprises:
   a main guide groove unit configured to guide movement of the carrier, and comprising the first guide groove; and
   an auxiliary guide groove unit configured to support the movement of the carrier.

5. The camera module of claim 3, wherein the main guide groove unit comprises first guide grooves that face each other in a direction perpendicular to the optical axis direction.

6. The camera module of claim 4, wherein the auxiliary guide groove unit comprises a second guide groove of which a surface, in contact with the ball member, is formed to be flat.

7. The camera module of claim 4, wherein
   the guide groove unit comprises a plurality of ball members comprising the ball member, and
   a ball member of the ball members disposed in the auxiliary guide groove unit has a larger size than another ball member of the ball members disposed in the main guide groove unit.

8. The camera module of claim 1, wherein the plurality of guide grooves comprise another first guide groove in which a portion, in contact with another ball member, has a curvature.

9. A camera module, comprising:
   a housing;
   a carrier accommodated in the housing, and configured to move in an optical axis direction;
   a lens unit accommodated in the carrier, and configured to move in the optical axis direction together with the carrier;
   a driving unit configured to move the carrier; and
   a guide unit configured to guide the movement of the carrier, and comprising:
      a ball member configured to move in the optical axis direction; and
      a guide groove unit comprising a plurality of guide grooves in which the ball member is disposed,
   wherein the plurality of guide grooves comprise a first guide groove in which a portion, in contact with the ball member, has a curvature.

10. The camera module of claim 9, wherein the first guide groove is in either one or both of point contact and line contact with the ball member.

11. The camera module of claim 9, wherein the guide groove unit comprises:
    a main guide groove unit configured to guide movement of the carrier, and comprising the first guide groove; and
    an auxiliary guide groove unit configured to support the movement of the carrier.

12. The camera module of claim 11, wherein the main guide groove unit comprises first guide grooves that face each other in a direction perpendicular to the optical axis direction.

13. The camera module of claim 11, wherein the auxiliary guide groove unit comprises a second guide groove of which a surface, in contact with the ball member, is formed to be flat.

14. The camera module of claim 11, wherein
    the guide groove unit comprises a plurality of ball members comprising the ball member, and
    a ball member of the ball members disposed in the auxiliary guide groove unit has a larger size than another ball member of the ball members disposed in the main guide groove unit.

15. The camera module of claim 11, wherein
    the plurality of guide grooves in the main guide groove unit extend along the optical axis direction, and
    the plurality of guide grooves in the auxiliary guide groove unit extend in different directions.

16. A camera module, comprising:
    a housing;
    a carrier accommodated in the housing, and configured to move in an optical axis direction;
    a lens unit accommodated in the carrier, and configured to move in the optical axis direction together with the carrier;
    a driving unit configured to move the carrier; and
    a guide unit configured to guide the movement of the carrier, and comprising:

a ball member configured to move in the optical axis direction; and a guide groove unit comprising a plurality of guide grooves in which the ball member is disposed, wherein the guide groove unit comprises:

a main guide groove unit in which the plurality of guide grooves extend along the optical axis direction; and an auxiliary guide groove unit in which the plurality of guide grooves extend in different directions.

17. The camera module of claim 16, wherein the guide groove unit comprises guide grooves facing in a direction perpendicular to the optical axis direction, and the auxiliary guide groove unit comprises:

a first guide groove extending in the optical axis direction; and a second guide groove extending in a direction oblique to the optical axis direction.

18. The camera module of claim 17, wherein the main guide groove unit comprises first guide grooves that face in a direction perpendicular to the optical axis direction.

19. The camera module of claim 17, wherein the first guide groove and the second guide groove have a 'v'-shaped cross-sectional shape.

* * * * *